United States Patent [19]
Tokunaga et al.

[11] Patent Number: 5,476,056
[45] Date of Patent: Dec. 19, 1995

[54] METHOD OF FORMING AIR LAYER OVER IMMERSED SURFACES OF STRUCTURE HAVING IMMERSED PORTIONS, AND STRUCTURE OF COAT LAYER FORMED OVER IMMERSED SURFACES

[75] Inventors: Junichiro Tokunaga; Makoto Kumada; Yoichi Sugiyama, all of Tamano; Nobuatsu Watanabe; Yong B. Chong, both of Kyoto; Naoki Matsubara, Tamano, all of Japan

[73] Assignee: Mitsui Engineering & Shipbuilding Co., Ltd, Tokyo, Japan

[21] Appl. No.: 240,763

[22] PCT Filed: Sep. 29, 1993

[86] PCT No.: PCT/JP93/01392

§ 371 Date: Jul. 12, 1994

§ 102(e) Date: Jul. 12, 1994

[87] PCT Pub. No.: WO94/07740

PCT Pub. Date: Apr. 14, 1994

[30] Foreign Application Priority Data

Sep. 29, 1992 [JP] Japan .................................. 4-259896
May 7, 1993 [JP] Japan .................................. 5-106953

[51] Int. Cl.⁶ .................................................. B63B 1/34

[52] U.S. Cl. .............................................. 114/67 A; 137/13
[58] Field of Search ........................... 114/67 R, 67 A; 137/13; 138/39

[56] References Cited

U.S. PATENT DOCUMENTS

| | | | |
|---|---|---|---|
| 2,764,954 | 10/1956 | Oeltgen | 114/67 A |
| 3,892,252 | 7/1975 | Poettmann | 137/13 |
| 3,973,510 | 8/1976 | McCulloch et al. | 114/67 A |

*Primary Examiner*—Jesus D. Sotelo
*Attorney, Agent, or Firm*—Nikaido, Marmelstein, Murray & Oram

[57] ABSTRACT

The present invention provides a method of reducing the fluid friction drag of ships and fluid transport channels and prevent contamination and corrosion of a structure having an immersed portion. The method of forming an air layer over an immersed surface of a structure having an immersed portion, comprising the steps of: covering the immersed surface of a structure (hull 1) having an immersed portion with a coating layer 3, which has depressions 6 and projections 7 at the surface thereof and which has at least vertices 7' of the projections 7 formed of a water-repellent material 8; and supplying air a to the surface 10 of the coating layer to form an air film 12 between the coating surface 10 and water 13.

32 Claims, 11 Drawing Sheets air quantity level
○: water-repellent plate A
□: water-repellent plate B

METHOD OF FORMING AIR LAYER OVER IMMERSED SURFACES OF STRUCTURE HAVING IMMERSED PORTIONS, AND STRUCTURE OF COAT LAYER FORMED OVER IMMERSED SURFACES

FIELD OF THE INVENTION

The present invention relates to a method of forming air layer over immersed surfaces of a structure having immersed portions and to a structure of a coating layer over the immersed surfaces intended to reduce the fluid friction resistance or drag of ships and the like.

BACKGROUND ART

Structures having underwater surfaces or surfaces in contact with water, such as ships and liquid transport channels, produce a flow of water along their surfaces as the ships travel or liquid moves, with the velocity of water being zero at the submerged surface of the structure. A velocity gradient near the structure's submerged surface depends on the viscosity of fluid and the shearing forces due to viscosity constitute the fluid frictional drag.

This fluid frictional drag experienced by the ship can be very large. Of the drags exerted on the ship as it navigates, which include a wave-making drag, a form drag and an air drag in addition to the fluid frictional drag, the fluid frictional drag accounts for as much as 60 to 70% of the total drag or resistance.

Considering such a large proportion of the fluid frictional drag, the best way to economize the propelling power and increase the speed of a ship is to minimize the fluid frictional resistance and the development of such a technology has been strongly called for in the industry.

Among the measures currently employed to reduce the fluid frictional drag of the ship are: a method which provides the bottom of the ship with projections to form frame-like air chambers and supplies air to the air chambers to form a layer of air over the surface of the ship's bottom; and what is generally called a micro-bubble method which blows out air over the surface of the hull to produce a large number of air bubbles over the surface.

With the former method, however, there is a problem that when a ship moves, the air contained in the air chamber flows out and replenishing the lost air requires a large power.

The latter method requires a large-scale compressor because friction resistance can only be reduced when a large quantity of air is supplied from nozzles provided at the side and bottom of the hull. This inevitably increases equipment cost and requires high power to drive the large-capacity compressor. While the supplied air that flows in the form of bubbles along the hull side and bottom reduces the fluid friction resistance, it should be noted that as the bubbles flow downstream, they repetitively combine together and merge into larger bubbles, reducing the area of the bubbles covering the hull and therefore the fluid friction resistance reduction effect. Hence, to obtain a significant reduction in the overall frictional resistance of the entire ship requires supplying a large mount of air, making it difficult to achieve a substantial reduction in the fluid friction drag. For these reasons, either of these methods cannot be put to practical use.

Floating structures such as anchored ships and barges or stationary structures such as underwater steel piles have problems that the surfaces of their submerged portions often have underwater organisms deposited thereon or are attacked by corrosion. As a means to solve these problems, it is a known practice to apply anticontamination or anticorrosion coating to the underwater surfaces. This method, however, not only requires troublesome maintenance of coating but poses a risk of noxious substances in the coating dissolving into water, resulting in environmental pollution.

DISCLOSURE OF THE INVENTION

The inventors of the present invention have conducted research on a way to reduce a fluid frictional drag significantly with a small power and successfully accomplished the invention. That is, the present invention provides a method of forming an air layer over an immersed surface of a structure having an immersed portion, as well as a coating layer structure. The method of forming an air film comprises the steps of:

covering the immersed surface of a structure having an immersed portion with a coat layer, which has minute depressions and projections at the surface thereof and which has at least vertices of the projections formed of a water-repellent material; and supplying air to the surface of the coating layer to form a thin air film between the coating surface and water.

The coating layer, as it is referred to herein, means films or sheet-like materials bonded to the surface of a structure, or a layer of coating formed over the surface of a structure, and has minute projections and dents formed in its own surface.

The coating film body formed on the immersed surface of a structure retains a thin air layer in water, which is not easily separated from the surface and can be retained by supplying only a small amount of air using very small power. Because the air layer prevents direct contact between water and the structure, the fluid friction resistance can be reduced and at the same time the contamination and corrosion of the structure prevented.

To describe in more detail, the coating film body formed over the submerged portion of a structure has minute projections and dents in its surface, with at least the surface of projected portions of the coating layer having a water repelling property. Hence, when air is supplied to the coating surface, the air easily flows into the depressed portions of the minute projection and is retained there by the action of the water pressure and the surface tension of water as well as by the water repelling effect of the coating layer.

Since the coating layer of this invention has a property of retaining small amounts of air in depressed portions of its own roughened surface under the water, when air is supplied to the coating surface, the air which tends to reduce the surface energy between water and air combines with the already existing air to effectively form a thin air layer inseparable from the coating film body surface, i.e. the immersed surface.

When the air layer thus formed is subjected to external disturbances and thereby urged to separate from the surface as bubbles, a pulling or retaining force acts on the bubbles, keeping the air layer adhering to the immersed surface. A layer of air on the free-stream flow side or at a position remote from the coating surface is drawn and separated by the flowing water and flows downstream. By supply a small amount of air to replenish the loss of air that flows with the free-stream flow, it is possible to maintain the air layer in good condition.

BEST MODE FOR CARRYING OUT THE INVENTION

[Embodiment 1]

By referring to FIGS. 1 through FIG. 24, we will describe an embodiment of a method of forming air films over immersed surfaces of a structure having immersed portions and also of a structure of the coating layer formed over the immersed surfaces.

Figure 1:
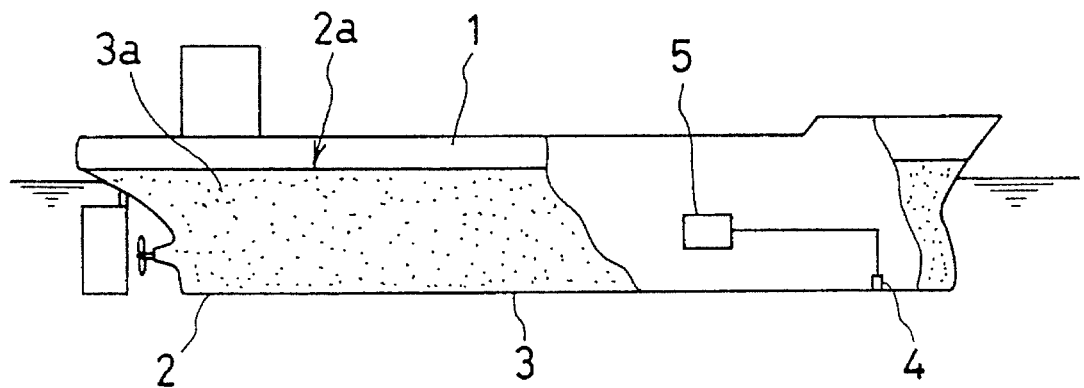
FIG. 1 is a partly cutaway side view of a ship showing one embodiment of this invention.

FIG. 1 is a side view of a ship to which the present invention is applied. In the figure, reference numeral 1 represents a hull, which has its bottom 2 and at least the submerged surface of its sides 2a coated with layer 3, 3a. The hull is provided with a nozzle 4 directed from the front toward the rear so that air delivered from a compressor 5 is blown out from the nozzle 4 along the coating surface 3 (3a).

Figure 2:
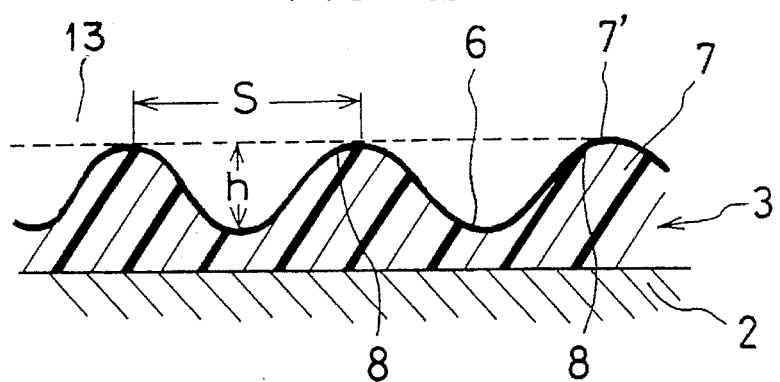
FIG. 2 is a cross section of the coating layer.

The coating film body 3 (3a), as shown in FIG. 2, has minute depressions 6 and projections 7 formed in its surface, with at least vertices 7' of the projections 7 formed of water-repellent material 8 having the contact angle with water of more that 90°. The minute projections 7 are so formed that their spacings s are 0.3 to 30 μm and the ratio h/s between the height h and the spacing s is about 0.3 to 3.

The water-repellent material may be formed of polytetrafluoroethylene, polyethylene, polystyrene, polypropylene, or water-repellent coating substance. It may also be formed of a hydrophilic resin such as polyvinyl chloride which was subjected to a plasma process using $CF_4$ gas to produce a water repelling property. Alternatively, the water-repellent material may be formed by processing a fine particles such as silica with a surface treatment agent such as perfluoroalkylsilane and by fixing them with resin so that parts of the surface project.

When the water-repellent fine particles are used, the resin need not be water repelling as it is intended to fix the particles. The resin may, for example, be polyester resin, phenyl resin, amino resin, epoxy resin, vinyl resin or urethane resin as long as they are suitable for coating.

While the water-repellent material 8 is normally provided at the vertices 7' that come into contact with water 13, it is of course possible to form the surface of the depressions 6 using the water-repellent material 8.

With the method of this invention for forming an air layer over the submerged surface of a structure, the fact that the immersed surface has fine depressions and projections and that at least the vertices 7' of the projections 7 are formed of water-repellent material having the contact angle with water of more than 90° produces the following effects. That is, as shown in FIG. 3, because the coating surface 10 or at least the vertices 7' of the projections 7 are formed of water repellent material, the layer has a water repelling property such that when air a is supplied to the coating film body surface 10, the air a will easily enter the depressions 6.

Figure 3:
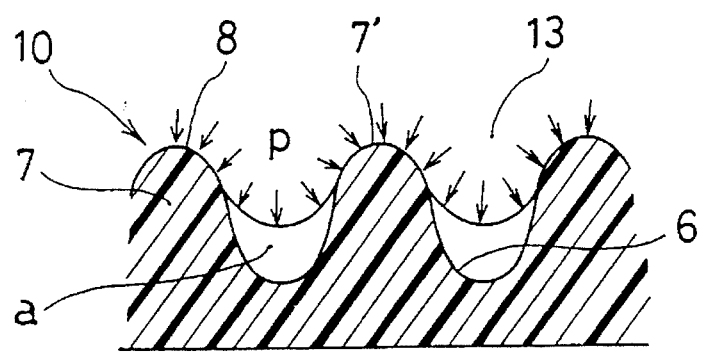
FIG. 3 is a cross section of the coating layer showing air trapped in depressions in the coating surface.

Such a coating surface 10 is produced on land, and therefore, when the coating surface 10 is submerged in water as shown in FIG. 3, the air a is retained stably in the depressions 6 by the water pressure P, the magnitude of which corresponding to the depth of water, and by the surface tension of water.

The contact angle with water on the coating layer surface 10 having fine depressions and projections is more than 90° or preferably more than 110°. The greater the contact angle, the more the effect of this invention can be expected.

Figure 4:
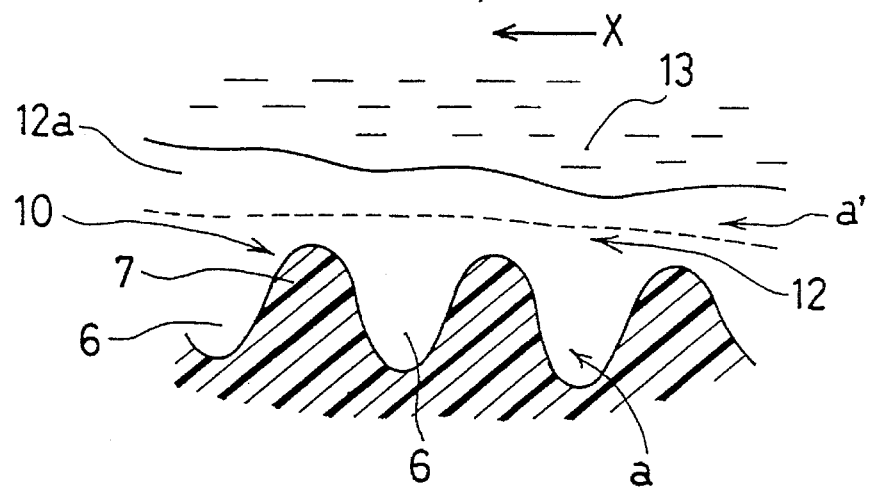
FIG. 4 is a cross section showing a layer of air formed over the coating surface.

FIG. 4 is a schematic diagram showing a model representing the above phenomenon. The coating surface 10 of water-repellent material having depressions 6 and projections 7 is immersed in water 13 and when air a' is supplied to the coating surface 10, the air a' easily flows into the depressions 6 formed in the surface 10 and gets trapped there as air a. In actual situation, the air that was holding to the coating surface 10 when the coating layer was in atmosphere is contained in the depressions 6 by the pressure of water 13 and the surface tension of water. If at least the projections 7 or the vertices 7' of the projections 7 are not formed of a water-repellent material as shown in FIG. 2, the air a will not be contained in the depressions 6 as shown in FIG. 3.

With the air a retained in the depressions 6 in this way, when additional air a' is further supplied as shown in FIG. 4, the air a' easily merges with the existing air a by the surface energy reduction effect to form a thin air layer 12 over the coating surface 10. As a result there are three layers made up of the coating surface 10, the air layer 12 and the water 13. In such a three-layer structure, when the water 13 flows in the direction X, the air layer 12 in contact with the coating surface 10 remains adhering to the surface while the air layer 12a on the flowing water 13 side is drawn by and flows with the water 13. Hence, by supplying a small amount of air to compensate for the air that is carried away by the flowing water 13, it is possible to maintain the air layer 12 in good condition.

Figure 5:
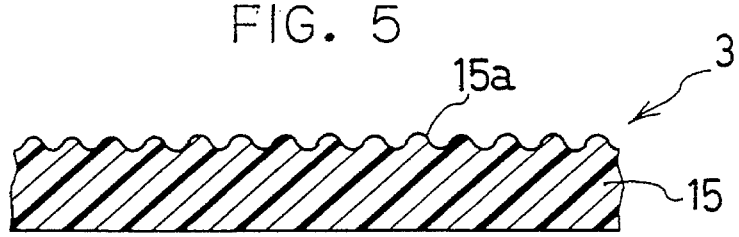
FIG. 5 is a cross section of the coating layer.

The coating layer having the aforementioned, minute depressions and projections is formed of, for example, a sheet or a coating layer of a synthetic resin. To describe in more detail, the fine depressions and projections 15a may be formed by a transfer method, which forms minute depressions and projections in a synthetic resin sheet 15, as shown in FIG. 5, by a roll having corresponding fine depressions and projections in its own surface; or by a press method which uses a die having fine depressions and projections; or by a screen mesh method which transfers a mesh pattern woven by fine threads; or by a high-density energy method using a laser or plasma.

When the sheet 15 formed in this manner is made of a water-repellent resin, it can be used as it is. When it is formed of a hydrophilic resin, the surface is treated to make it water repellent.

Figure 6:
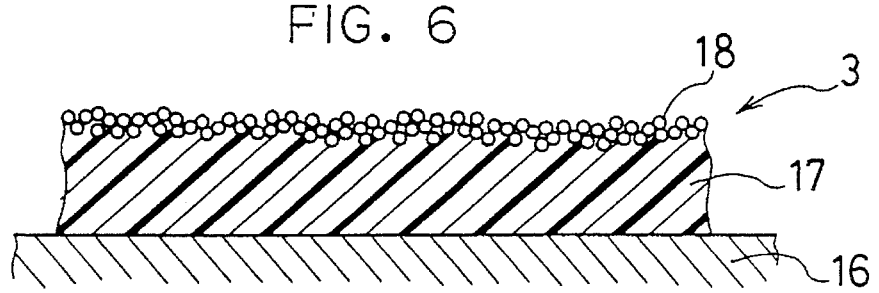
FIG. 6 is a cross section of the coating layer.
Figure 7:
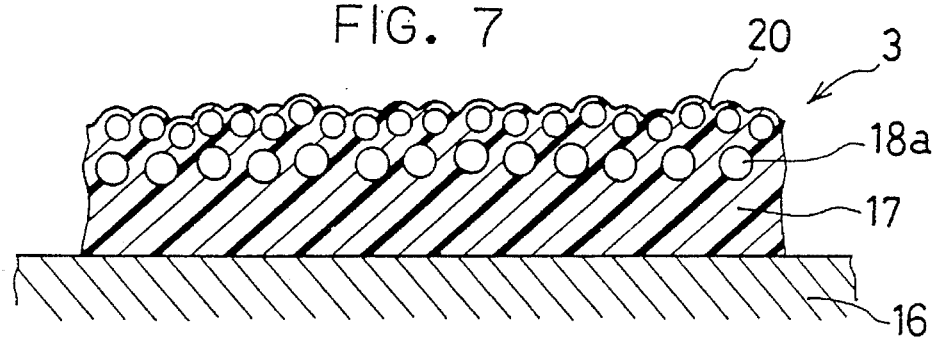
FIG. 7 is a cross section of the coating layer.
Figure 8:
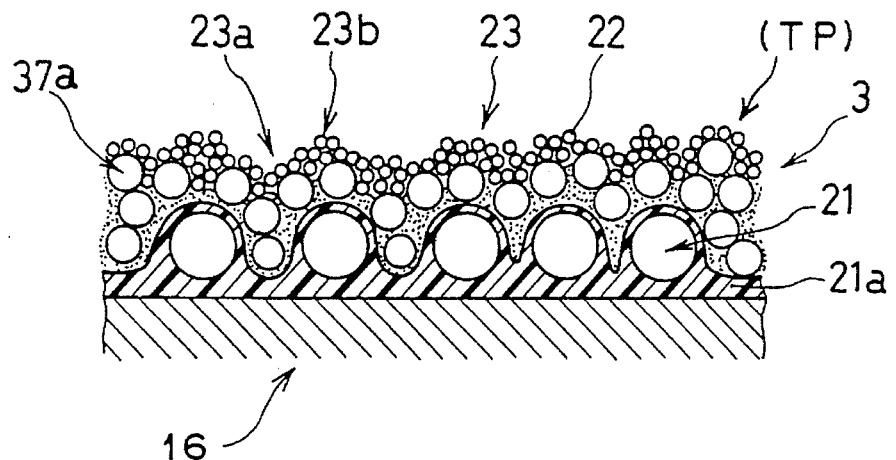
FIG. 8 is a cross section of the coating layer with a multilayer structure.

FIG. 6 to FIG. 8 show an embodiment in which the coating layer 3 is formed of a layer of coating.

In FIG. 6, the coating layer 3 has water-repellent fine particles 18 attached to the surface of a coating 17 formed over the surface of a structure 16. That is, the coating layer 3 is formed as follows. The coating 17 is applied as adhesive to the surface of the structure 16; and the fine particles 18 are attached to the surface of the coating 17 by spraying or projection, or the coating 17 scattered with the fine particles 18 is applied to the surface of the structure 16, letting the fine particles 18 be exposed at the coating surface. When the fine particles 18 are made of hydrophilic material, they are surface-treated to provide a water repelling property.

FIG. 7 is a cross section of a coating layer 3 formed by another method. The process of forming the coating layer 3 in this case consists in: applying, through spraying or projection, a layer of fine particles 18a made of water-repellent or hydrophilic material on the coating 17 formed over the surface of a structure 16, or mixing the fine particles 18a with the coating material and applying it to the surface of the structure to form a layer of fine particles 18a mixed in the coating; and then applying a film 20 over the surfaces of the fine particles 18a. In this case, also, when the film 20 is made of hydrophilic material, it is surface-treated to give it a water repelling property.

FIG. 8 is a cross section of a coating layer 3 formed by still another method. The forming process consists in: forming a first coating layer 21a containing relatively large particles 21 (for example, glass beads); forming a second coating layer on the first coating layer 21a; and applying a layer of water-repellent fine particles 22 over the surface of the second coating layer, or further applying a water-repellent film over the fine particles 22 (as in the case of FIG. 7) to form a surface 23 with fine depressions and projections. By forming a multilayer structure in which a surface layer including the fine particles 22 is formed over the first coating film body 21a containing relatively large particles 21 as mentioned above, a so-called composite roughened surface consisting of relatively large depressions and projections 23a and fine depressions and projections 23b is obtained. With such a structure of the coating layer 3, the air being supplied to the proper place in the coating surface 23 is quickly spread over the entire coating surface 23, with the large depressions and projections 23a used as air passages and the small depressions and projections 23b as air retaining surfaces. In this way, an intended air film can be obtained.

Though not shown, a coating layer with fine depressions and projections may be formed by an electrolytic or electroless dispersion plating. That is, when a substrate is plated with a plating liquid mixed with polytetrafluoroethylene particles, the polytetrafluoroethylene particles are deposited together with a metallic matrix to cover the surface, forming fine depressions and projections.

The inventors of this invention conducted a model test to evaluate the effects of the coating layer with fine depressions and projections has on the reduction in the fluid friction resistance of a ship.

Although this invention may be applied to all the immersed surfaces such as hull bottom and hull sides, the test was done by covering only the surface of the hull bottom with a water-repellent coating layer having fine depressions and projections in order to obtain a result in a short period of time. The details of the test are as follows.

(Test 1)

Figure 9:
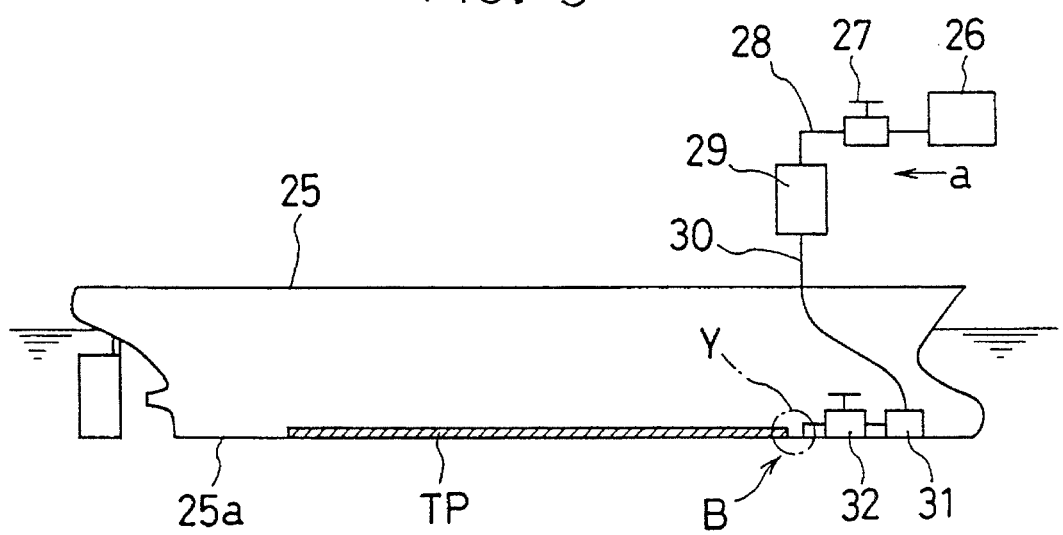
FIG. 9 is a schematic diagram showing a model ship used in the test of this invention.
Figure 10:
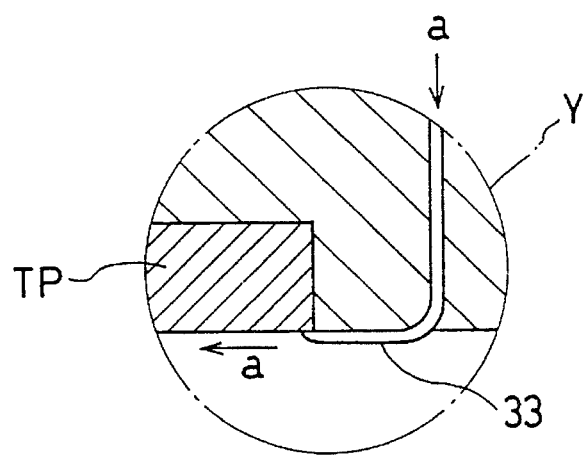
FIG. 10 is an enlarged cross section of a portion Y shown in FIG. 9.
Figure 11:
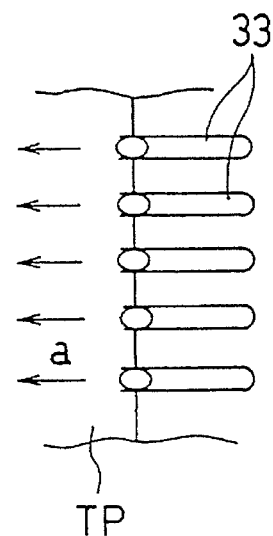
FIG. 11 is an enlarged bottom view of a portion indicated by arrow B in FIG. 9.

FIG. 9 is a schematic diagram showing the model ship used in the test for verifying the effects of this invention. FIG. 10 is an enlarged view of a portion Y in FIG. 9. FIG. 11 is an enlarged bottom view of a nozzle portion indicated by arrow B in FIG. 10.

In FIG. 9, a compressor was installed separate from the model hull 25 to deliver pressurized air a through a valve 27 and a pipe 28 to a flow meter 29-which metered the flow of the air-and from there through a pipe 30 to the bottom of the hull 25. The air a is branched by a branching pipe 31 at the bottom 25a of the hull 25 into many pipes, which are then connected through valves 32 to a large number of nozzles 33 (small tubes 0.6 mm in diameter) to blow air along a test piece TP described later as shown in FIGS. 10 and 11. The nozzles 33 are directed from the upstream to the downstream side of the moving ship. The large number of nozzles 33 are arranged in a straight line at constant intervals as shown in FIG. 11.

The test piece TP used in the test is a coated aluminum flat plate (which corresponds to the structure 16) 400 mm wide by 500 mm long by 1 mm thick.

The coating layer of water-repellent material applied to this test piece has a multilayer structure with a composite concave/convex surface as shown in FIG. 8. The immersed surface (coating film layer 3) of the water-repellent coating layer has a water repelling characteristic that exhibits the contact angle with water of 165°. In the surface, the average height and spacing of large undulations of the first coating layer 21a are 6.8 μm and 25.1 μm respectively and the average height and spacing of fine depressions and projections are 0.9 μm and 3.0 μm respectively.

The coating layer has a three-layer structure consisting of: a first coating layer 21a containing particles 21 such as glass beads 50 μm in diameter; an intermediate coating layer formed over the first coating layer 21a and including hydrophobic silica 37a 12 μm in diameter; and a surface coating layer including hydrophobic silica (fine particles 22) 1.4 μm in diameter.

Fourteen of such flat-plate test pieces TP were joined together to form a larger test piece TP 800 mm wide by 3500 mm long, which was then mounted to the bottom 25a of the hull 25 of the model ship measuring 7,276 m long, 1.28 m wide and 0.6 m deep so that the front edge of the test piece TP was located 1.45 m from the bow.

As shown in FIG. 10 and FIG. 11, nozzles 33 formed of syringe needles 0.6 mm in inner diameter for blowing out air were arranged at the front edge of the test piece TP at equal spacings (about 20 mm).

The hull 25 has a 200-mm draft in ballast. In this condition, the tested hull 25 had an immersed area S of 9.81 m$^2$, the area St of the test piece TP was 2.82 m$^2$, and the area ratio St/S was 0.285.

A towing water tank 220 m long, 14 m wide and 6.5 m deep was used for the hull drag test. The hull 25 was coupled to a towing car and at each ship speed a specified amount of air was delivered from 40 syringe nozzles 33 in the form of minute bubbles flowing from the bow to the stern, while at the same time measuring the drag of the hull 25 by using a drag power meter.

Table 1 shows reductions in drag (DR) of the model ship expressed in terms of viscous drag and reductions in frictional drag of the test piece TP (DR') at various ship speeds. DR and DR' can be represented by the following formulas.

$$DR = -(C_t - C_{t_0})/C_{v_0} \times 100\%$$

$$DR' = (1+K) \cdot DR/(St/S)$$

where $C_t$=total drag coefficient of the tested model ship, $C_v$=viscous drag coefficient of the tested model ship, subscript 0= normal tests not using the water-repellent flat plate, and K=form influence factor (K=0.222).

Table 1 shows that the DR reached the maximum value of 19.4% at the ship speed of U=2.11 m/s. The relation between the DR at the ship speed of U=2.11 m/s and the air quantity level, a measure of average air layer thickness is shown in FIG. 12.

The air quantity level is an index representing the average air film thickness calculated on the assumption that the air layer, formed by a combination of the air retained in the depressions in the coating layer surface and the supplied air, flows uniformly at the same speed as the ship. At the ship speed of U=2.11 m/s (Froude number Fr=0.25), the actual amount of air supplied Qa is as shown in Table 2.

Figure 12:
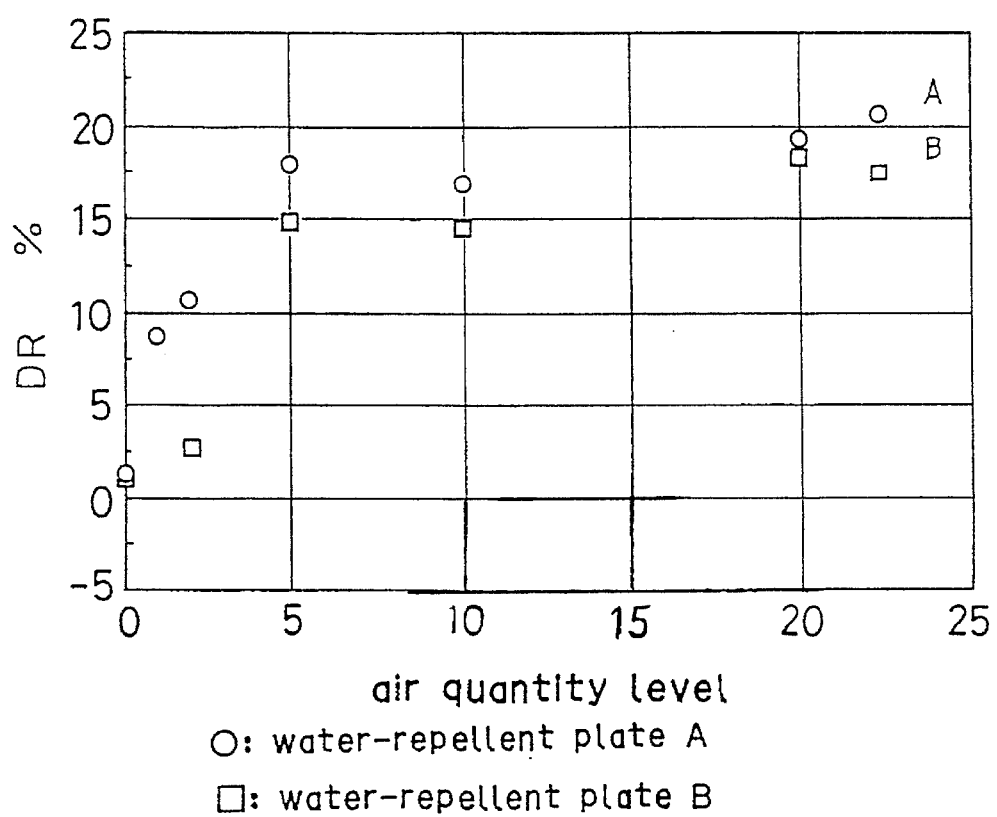
FIG. 12 is a graph showing the relationship between the air quantity level and the amount of drag reduction or DR.

FIG. 12 indicates that the frictional resistance reduction effect is produced by the supply of only a small amount of air. There is a tendency that up to the average air layer thickness of 0.24 mm (air quantity level 5), an increase in the amount of air is accompanied by an increase in DR % and that beyond this thickness, the DR % remains almost constant. In this embodiment, the maximum value of DR of 19% was reached at the air quantity level 20. The DR', which concerns only the test piece TP portion, reached as high a value as about 83%.

According to the observation of the air flow ejected from the nozzles 33, we found that the air a delivered from the nozzles flowed along the surface of the test piece TP toward the stern while adhering to and spreading over the test piece surface.

For comparison, a polytetrafluoroethylene plate with a smooth surface, which was not surface-treated, was also tested taking the place of the test piece TP. In this case, the air blew out of the nozzles 33 as bubbles without adhering to the polytetrafluoroethylene plate and flowed downstream in the form of individual separate bubbles.

This indicates that the use of the specially formed coating layer over the test piece TP-whose surface has minute depressions and projections and also has at least the vertices of projected portions of the depressions and projections formed of a water-repellent material to give them a certain range of water repelling property-and the supply of air between the coating layer surface and the water combine not only to allow an air layer to be formed between the coating surface and the water but also to keep the air of the air layer adhering to the coating surface, with only that part of the air layer close to the streaming water being carried away by the water.

When the air layer is formed over the surface of the coating film body, the coating film body surface is no longer in direct contact with the water, resulting in a significant reduction in the fluid frictional resistance, as is evident from fluid mechanics.

Figure 13:
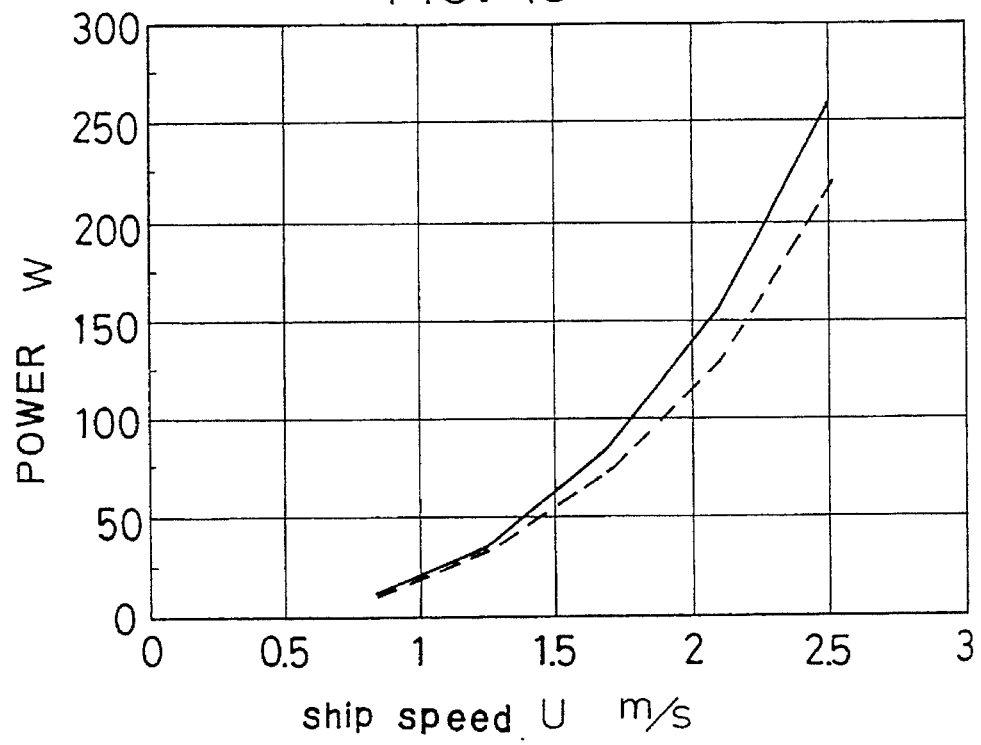
FIG. 13 is a graph showing the relationship between the ship speed and the power required.

It is easily understood that this in turn allows saving of propelling power. FIG. 13 shows the relationship between the speed of the hull 25 and the power required for propulsion, according to the results of the test using the model ship. In the diagram the solid line represents a required power (including the air delivery power) when a smooth polytetrafluoroethylene plate was mounted and a broken line represents a required power when a layer of air was formed by the coating film body surface of this invention. It is seen that the higher the speed of ship, the larger the power reduction.

In actual ships, there are various kinds of oscillations or ship motions while navigating. When the hull is oscillated, it is required that the coating film body surface, which was formed as mentioned above, be able to retain the air layer effectively.

To test this characteristic, the hull 25 was given a moderate cyclic rolling motion in the range of ±3° and at the same time air was blown out from the nozzles 33. The result is that the air ejected from the nozzles 33 flowed along the test piece TP while spreading to form a thin air layer over the surface of the test piece. Despite the rolling motion of the ship, it was confirmed that the air layer was reliably formed although a slight performance degradation was observed.

Whether the hull 25 is rolling or not, it is therefore verified that in the hull 25 which has the test piece TP with the coating film body surface 10 formed according to this invention, the supply of a small amount of air permits an air layer to be formed and maintained reliably. It is thus appreciated that the invention is very effective in reducing the fluid friction when a ship navigates.

(Test 2)

Figure 14:
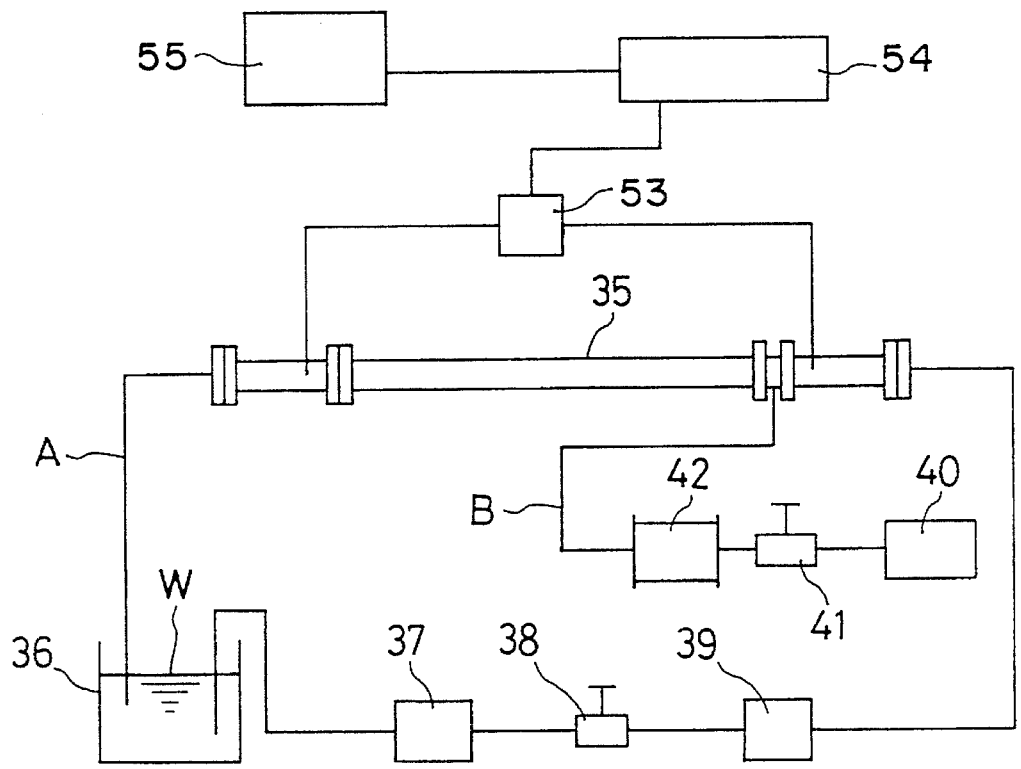
FIG. 14 is a schematic diagram showing the configuration of an in-pipe fluid friction resistance test equipment.

FIG. 14 shows a system diagram of a test apparatus to check the fluid friction reduction when the structure having immersed portions is a liquid transport pipe. Denoted 35 is a copper cylindrical pipe, which is connected with two systems of piping: a water system A and an air system B. In the water system A, water W in a synthetic resin container 36 is transported by a pump 37 through a valve 38 and a flow meter 39 to the copper pipe 35, from which the water is returned to the container 36, thus forming a closed loop. In the air system B, on the other hand, a mini-compressor 40 delivers air through a valve 41 and a flow meter 42 to syringe needles not shown, from the nozzles of which the air is injected into that end of the copper pipe 35 on the water incoming side. Eight such syringe needle nozzles are arranged in the copper pipe at specified spacings along the circumferential direction. The internal surface of the copper pipe 35, which constitutes the submerged surface, is formed with fine depressions and projections by electrolytic dispersion plating, with the projections covered with a water-repellent material.

Figure 15:
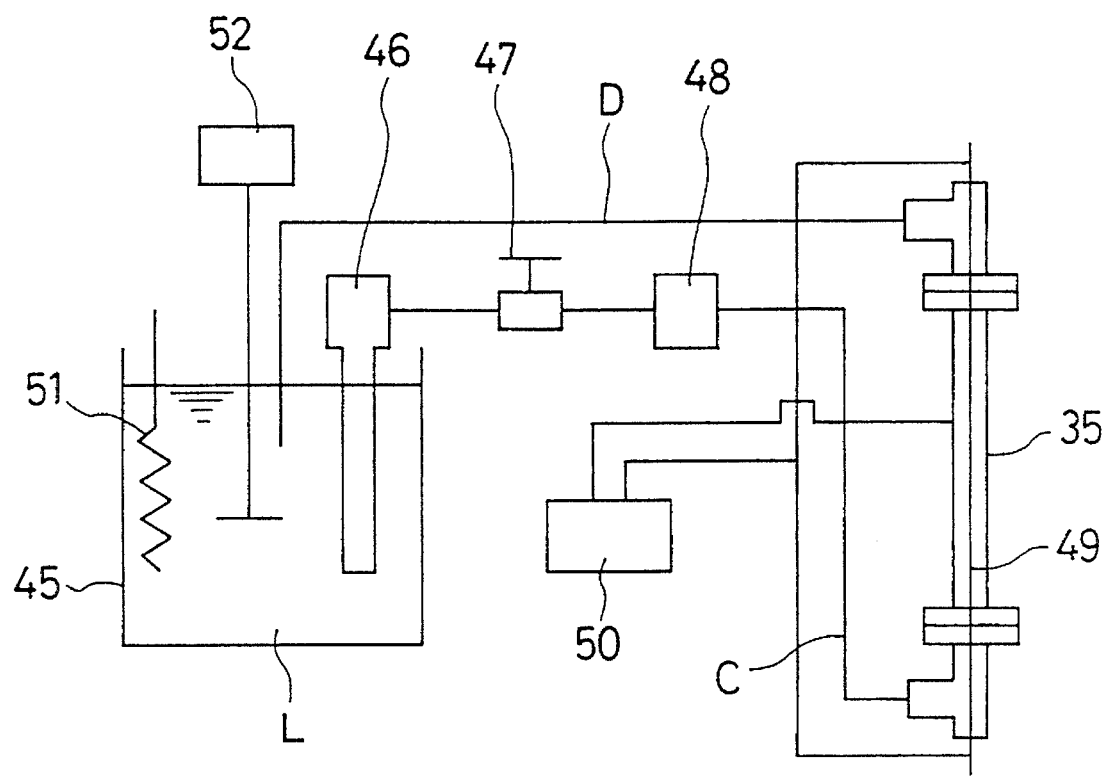
FIG. 15 is a schematic diagram showing the configuration of a plating device for plating the inside wall of a pipe.

The method of forming the coating layer having fine depressions and projections by using a plating technique is described below. As shown in FIG. 15, the plating bath 45 and the copper pipe 35 are interconnected by a line C and a line D, the line C consisting of a pump 46, a flow adjust valve 47 and a flow meter 48. A nickel rod 49 as an anode installed inside the copper pipe 35 is connected with a dc power supply 50. Designated 51 is a heater and 52 an agitator.

The composition of a dispersion liquid L in the plating bath 45 is as follows.

Nickel sulfamate: 350 g/liter
Nickel chloride: 45 g/liter
Boric acid: 40 g/liter
polytetrafluoroethylene particles: 200 g/liter The electrolytic dispersion plating was done under the following conditions.

Figure 16:
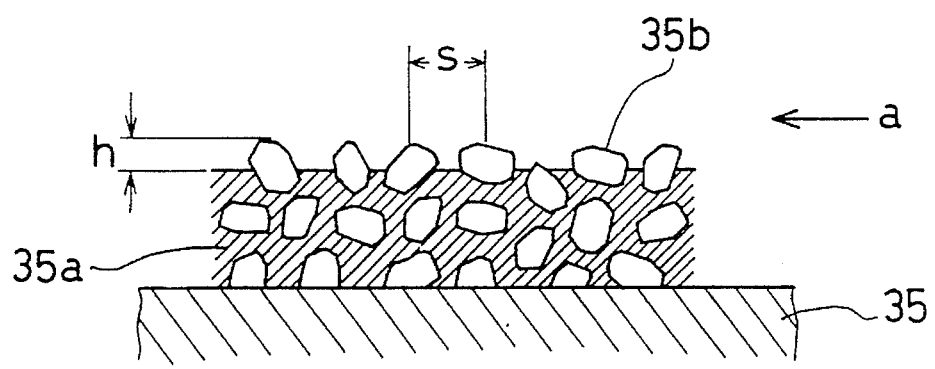
FIG. 16 is a cross section of the coating layer produced by the plating device of FIG. 15.

Dispersion liquid temperature: 45° C.
Current density: 4.5 A/dm$^2$
Current conduction time: 30 minutes
Average flow velocity of the dispersion
liquid in the pipe: 45 to 50 m/s Observation of the plated layer (coating layer) on the inner surface of the copper pipe 35 by a laser microscope has found that the polytetrafluoroethylene particles 35$b$ protrude from the surface of the nickel layer 35$a$ formed on the inner surface of the copper pipe 35, as shown in FIG. 16. It was also found that the spacing s between the particles 35$b$ is in the range of 0.3 to 30 μm and their height to spacing ratio h/s falls in a 0.3 to 3 range.

The copper pipe 35-whose inner surface was coated with a plated layer (coating film layer) which has fine depressions and projections on its surface and which has its projections formed of water-repellent polytetrafluoroethylene particles 35$b$-was arranged as shown in FIG. 14 for a pressure loss measurement test. The minicompressor 40 and the pump 37 were activated to supply air and water into the copper pipe 35 to measure the pressure difference across the tested section by a differential pressure meter 53. The measured values were recorded continuously on a pen recorder 55 through a low-pass filter 54.

Figure 17:
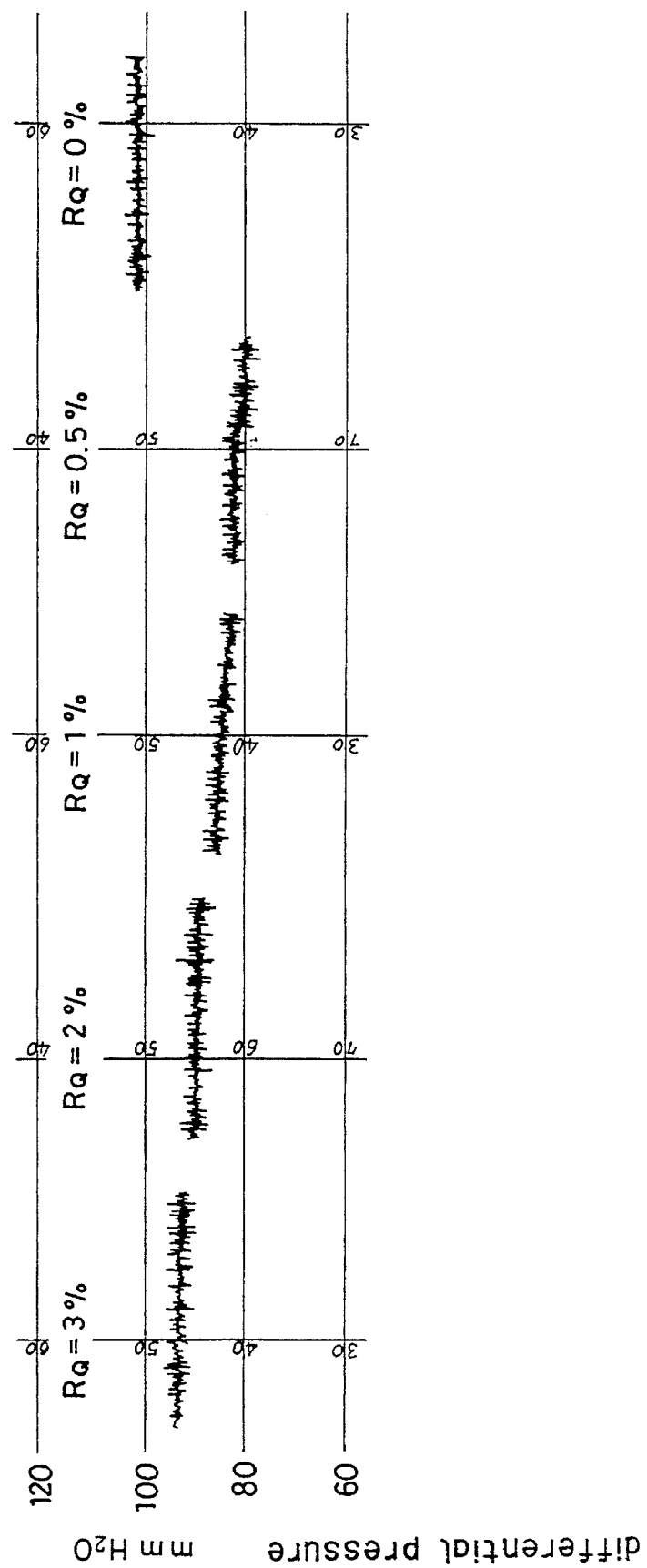
FIG. 17 is the result of measurements of pressure difference between the ends of a tested section of a pipe.

The test was conducted with the in-pipe average flow velocity V of 0.5 to 3 m/s and the ratio of introduced air quantity to water flow $R_Q$ of 0.5 to 3 vol %. One of the results of such pressure loss measurement tests for V=1.6 m/s is shown in FIG. 17, which indicates that the introduction of air reduced the pressure loss. It is also seen that the smaller the amount of air introduced, the larger the reduction in the pressure loss.

Figure 18:
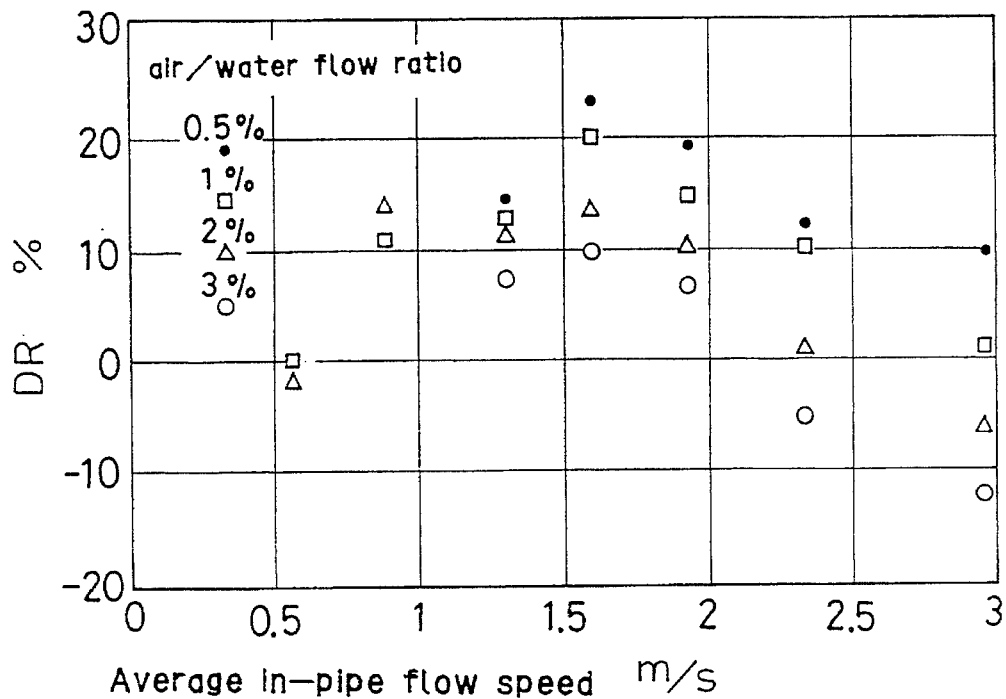
FIG. 18 is a diagram showing the relationship between the in-pipe average flow velocity and the amount of drag reduction or DR.

FIG. 18 shows the relationship between the in-pipe average flow velocity V and the reduction in pipe friction drag (DR), obtained by calculating the friction factor from the pressure loss measurement test results. The graph indicates that about 23% of the drag reduction is achieved for V=1.6 m/s when the air/water flow ratio $R_Q$ is as small as 0.5 vol % (black dot in the diagram).

Two kinds of pipes were manufactured: one is a polytetrafluoroethylene pipe with a smooth internal surface which is made of a water-repellent material having the contact angle with water of more than 90°; and the other is a copper pipe coated on its internal surface with a hydrophilic material having the contact angle with water of less than 90° whose inner surface is formed with minute depressions and projections. They were subjected to the above-mentioned pressure loss measurement test. It was found that the pressure loss increased with both pipes and this tendency became prominent as the amount of air increased.

Figure 19:
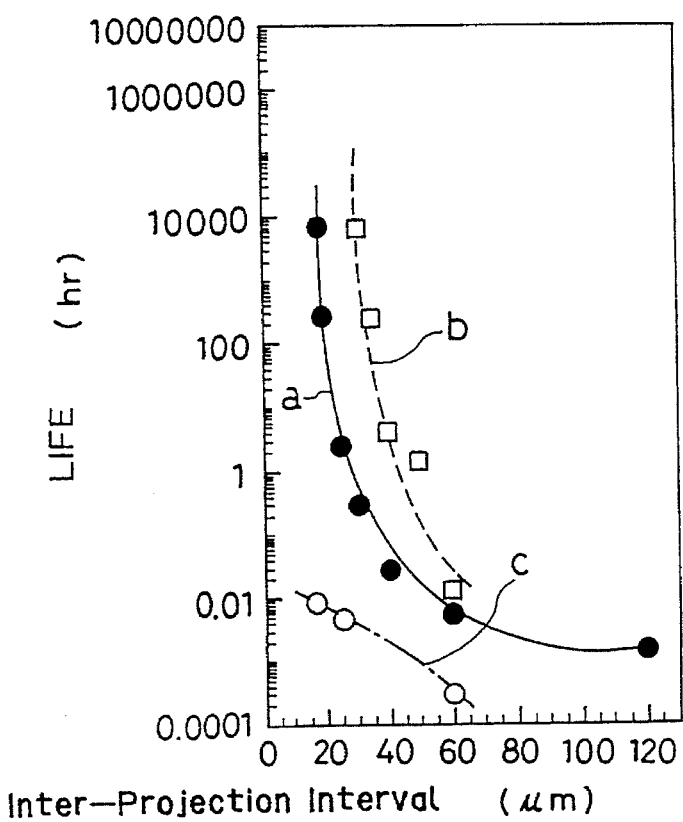
FIG. 19 is a graph showing the relationship between the spacings of projections and the life of the air layer.

The effects of the projection spacing s on the life of the air layer were also examined and the result is shown in FIG. 19.

Three kinds of resin plates-polypropylene, polyvinyl chloride and polytetrafluoroethylene-were used as the test pieces (2×5 cm) formed with fine depressions and projections by transfer method on the surface. These test pieces were immersed 10 cm below water surface and it was confirmed that an air layer adhered to the surfaces of all the test pieces. Measurement was taken of the time it took for 10% of the air layer covering the entire area of each test piece to be eliminated. These time measurements taken as the life of the air layer of each test piece were compared.

In FIG. 19, the curve a represents the data of polypropylene, the curve b that of polytetrafluoroethylene, and the curve c that of polyvinyl chloride. The test result has found that the polypropylene and polytetrafluoroethylene resins can be used in this invention but the polyvinyl chloride is not suited.

The result of the air layer life time measurement test indicates that as the projection spacing is reduced, the life of air film sharply increases. Particularly in the case of polytetrafluoroethylene, the life of more than 300 days is secured when the projection spacing is set to less than 30 μm.

Figure 20:
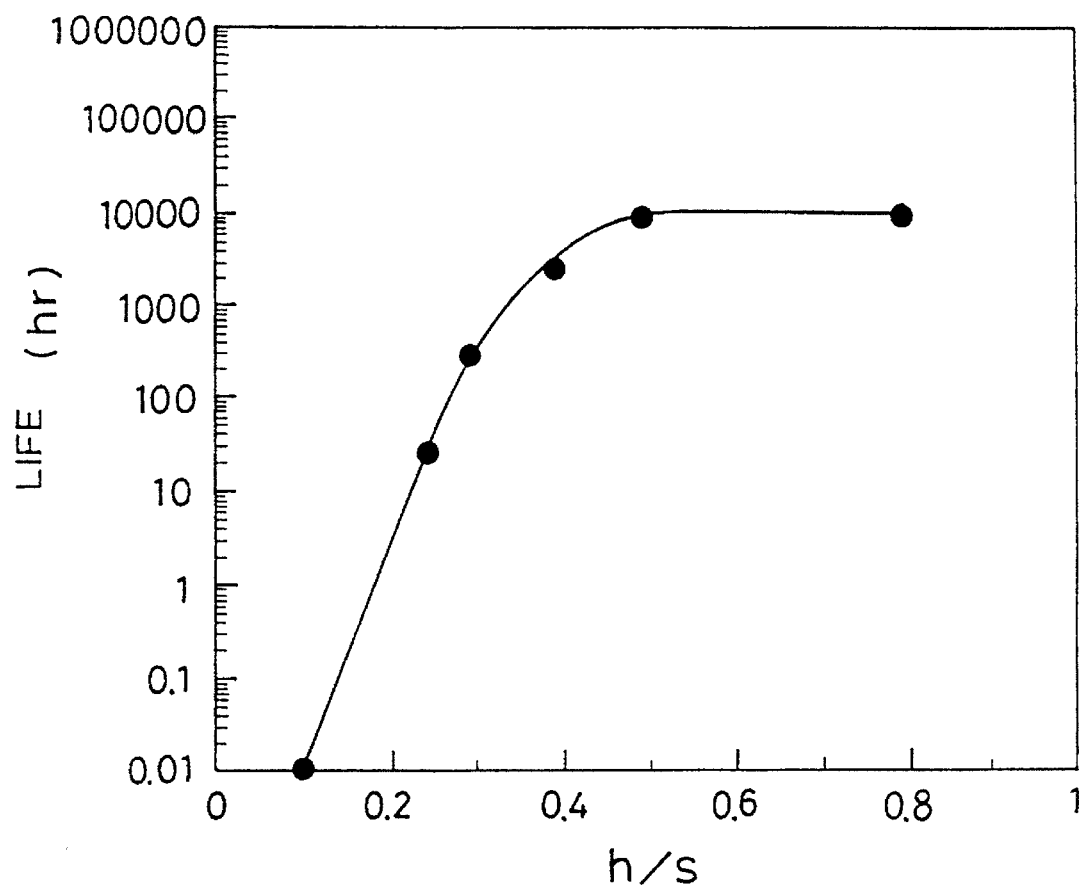
FIG. 20 is a graph showing the relationship between the height/spacing ratio h/s and the life (hours) of the air layer.

Investigation was also made of the effects that the ratio h/s of projection height h to the spacing s has on the air layer life. The results are shown in FIG. 20. The graph indicates that when the projection height-spacing ratio h/s is set at more than 0.3, the air film can be maintained for a long period of time.

Other test results indicate that too great a projection height h and too small a spacing s result in an increase in the fluid friction resistance. It is therefore desirable to set the ratio h/s in the range of 0.3 to 3.

(Test 3)

The inventors of this invention further conducted experiments to examine the condition in which the air layer formed over the coating surface is retained and to find a better way to form the submerged surface with depressions and projections.

Figure 21:
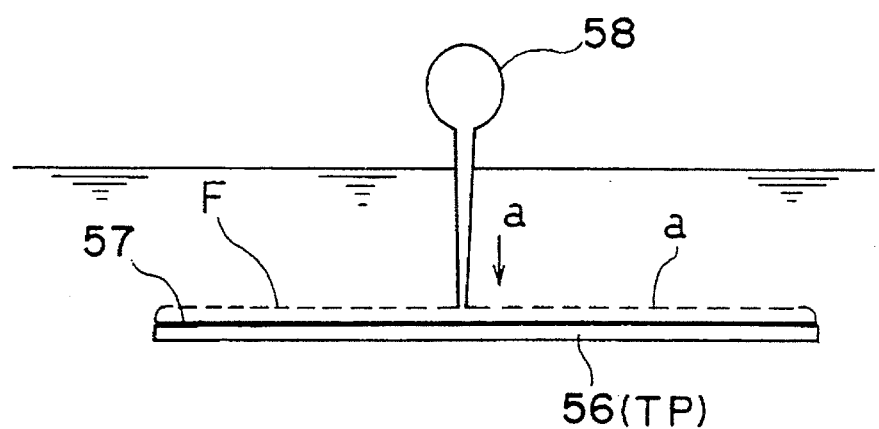
FIG. 21 is a schematic view showing a verification test of the air layer formed over the coating surface.

A test piece TP was manufactured, which consists of an aluminum plate 56 as a substrate and a coating layer 57 formed over the surface of the aluminum plate 56, as shown in FIG. 21, the coating layer having a composite roughened surface of the multilayer structure of this invention with depressions and projections, shown in FIG. 8. (The coating film body 57 is formed by: applying a primer containing glass beads of a relatively large grain diameter to form a first coating film body on the surface of the substrate; applying to the first coating film body a resin containing water-repellent silica particles with average diameter of about 12 μm to form an intermediate coating layer; and further applying to the intermediate coating film body a resin containing water-repellent silica particles 22 with average diameter of about 1.4 μm to form a top layer. The coating layer 57 has a composite undulated or roughened surface formed by a combination of relatively large depressions and projections 23$a$ and fine depressions and projections 23$b$ formed on their top.)

The test piece TP was immersed in water so that the coating layer 57 side faced up, and a syringe 58 was set close to the surface of the coating layer 57. It was observed that when air a was supplied from the syringe 58, the air a, rather than moving upward, quickly spread over the entire surface of the coating layer 57, forming an air layer F which was retained there. When the air a was supplied in amounts greater than could be retained in the surface of the test piece TP, a part of the supplied air separated from the coating surface 57 and moved up in the form of bubbles.

Figure 22:
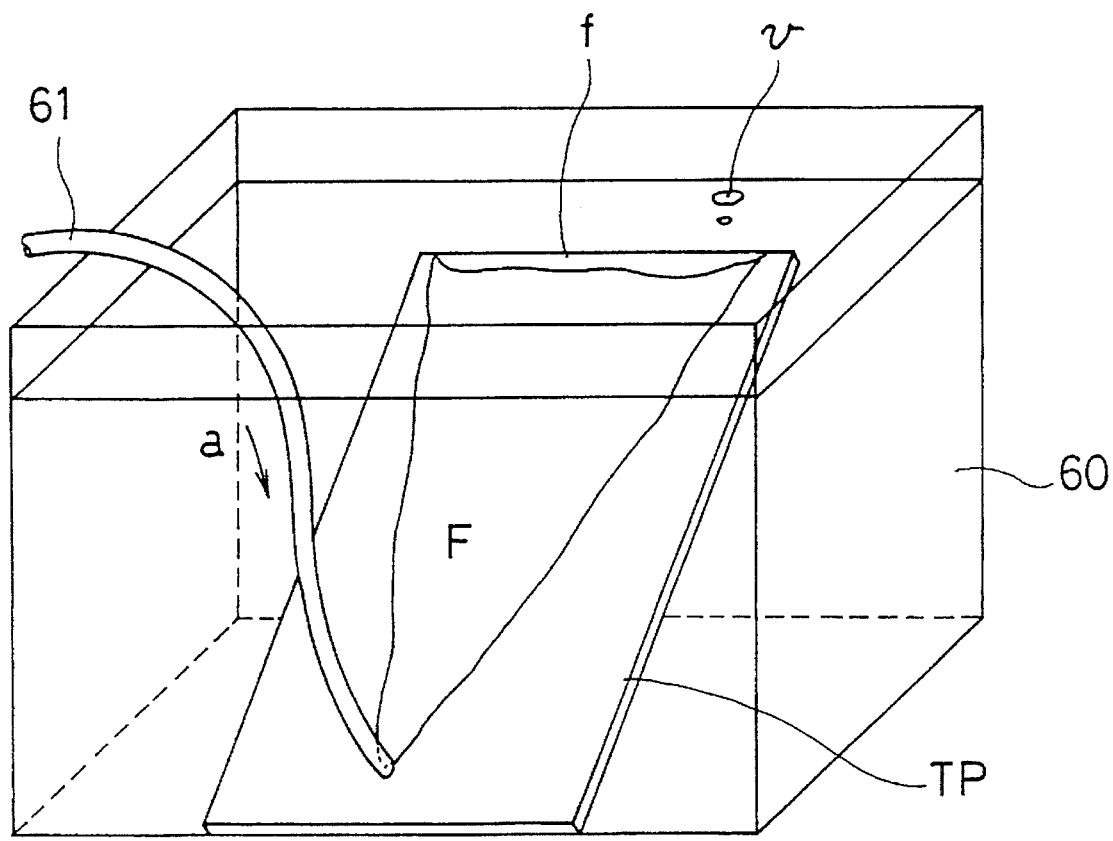
FIG. 22 is a schematic view showing a verification test of the air layer formed over the coating surface.

In another experiment, the test piece TP was submerged inclined in water in a tank 60, as shown in FIG. 22. When air a was supplied through a narrow tube 61 to the lower end portion of the test piece TP, the air a did not separate from the surface of the test piece TP and move vertically upward but instead spread along the inclined surface, forming a triangular air film F that widens upward along the inclined surface.

When additional air a was further supplied, it was observed that the amount of air contained in the air layer F became larger than could be retained in the surface of the test piece TP, that an air build-up f formed at the upper end portion of the test piece TP, and that the air build-up f locally swelled to separate as bubbles v that moved up to the water surface.

[Embodiment 2]

It is clearly seen that, as explained in the Embodiment 1, the air, when supplied to the coating surface which was made according to this invention, is formed into an air layer that firmly adheres to the coating surface. By taking advantage of this phenomenon, it is possible to provide excellent anticontamination and anticorrosion effects.

This invention is expected to produce such excellent effects when applied to ships at rest, floating breakwaters fixedly installed in water, barges, dikes, and underwater piles.

Figure 23:
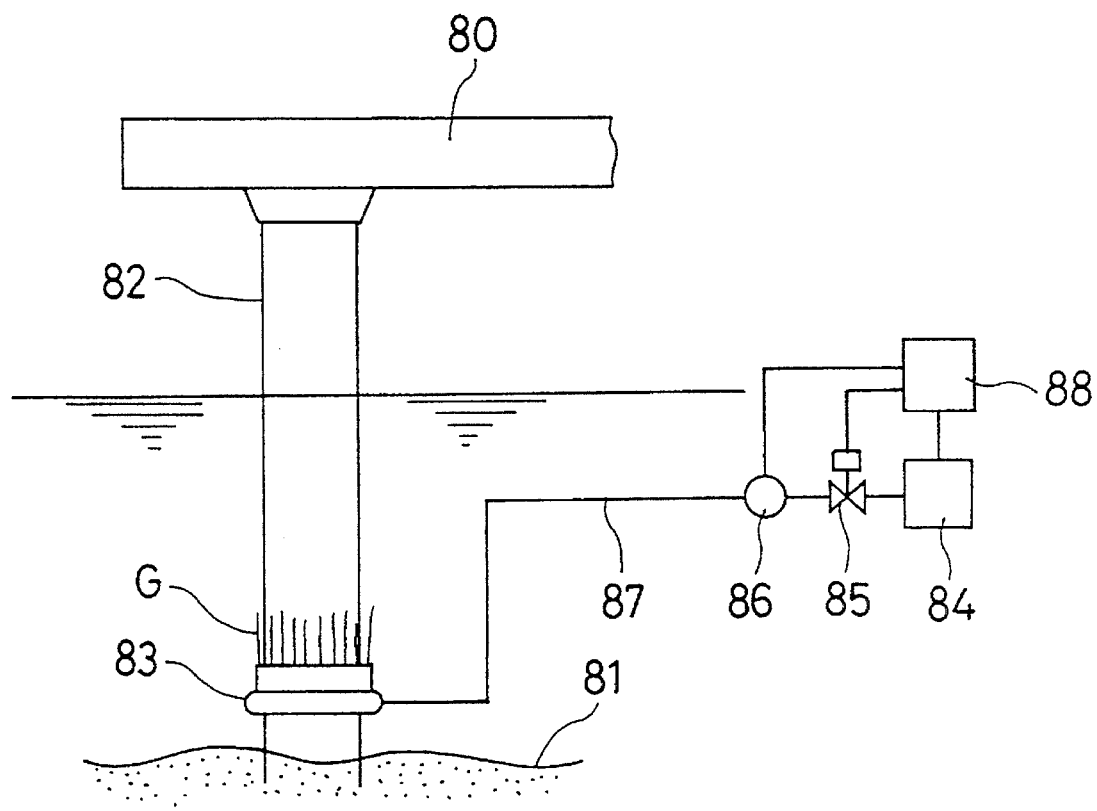
FIG. 23 is a schematic diagram showing this invention applied as a means for preventing contamination and corrosion of a pier.

FIG. 23 shows a pier, which is covered with the coating film body of this invention to prevent underwater organisms from adhering to the coating surface.

A leg 82 of the pier (underwater structure) erected in the sea bottom 81 is provided at its lower portion with a ring-shaped air blowing apparatus 83, from many small openings of which air G is blown out. The leg 82 has depressions and projections formed at least on the surface of the layer, with at least the vertices of the projections coated with a layer of water-repellent material similar to that used in the Embodiment 1.

In the pier 80 of such a construction, a compressor 84 was connected through a control valve 85, a flow meter 86 and a pipe 87 to the air blowing apparatus 83, and compressed air was controlled by a controller 88 and supplied to the air blowing apparatus 83, from whose nozzles the air was blown around the leg 82 to form a thin air layer over the leg surface. This air layer has prevented underwater organisms and seaweeds from coming into contact with the surface of the leg 82 so that the leg has been kept free from contamination for a long period of time.

[Embodiment 3]

Figure 24:
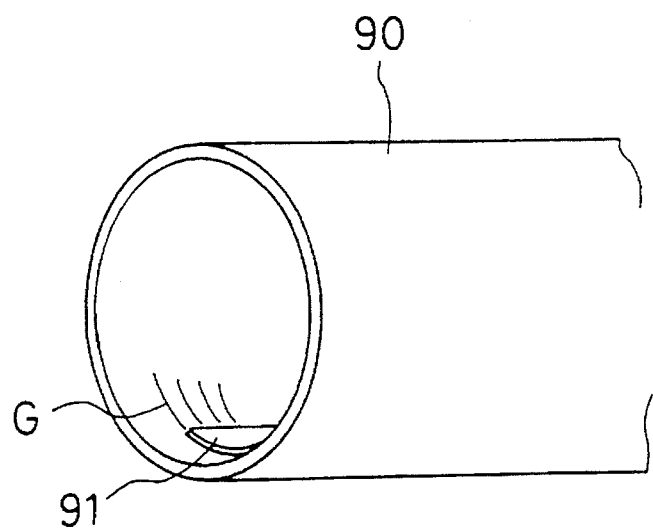
FIG. 24 is a schematic diagram showing this invention applied as a means for preventing contamination and corrosion of a water intake pipe.

FIG. 24 shows a water intake pipe in an electric power generation plant to which the present invention is applied. The inner surface of the water intake pipe 90 is formed with a coating layer of this invention and a nozzle 91 is shown installed at the bottom of the inner surface to eject secondary air G onto the inner surface of the water intake pipe 90 and thereby form an air layer.

The nozzle 91 is preferably arranged over the entire length of the water intake pipe 90 and it is further desirable that the nozzle be installed not only at the bottom but also at a circumferentially intermediate portion as well so that the air can be fed over the entire inner surface of the pipe.

It is noted that the present invention is not limited to the above embodiments and that various modifications and additions may be made. The features of this invention may be summarized as follows.

1) The present invention forms a thin air layer over immersed portions of a structure. The invention is characterized in: that the coating layer formed over the surface of the immersed portions of a structure has on its surface minute depressions and projections, with at least the vertices of the projections formed of a water-repellent material; and that air is supplied to the coating surface to form a thin air layer between the coating surface and water.

That is, by supplying air to the coating surface formed over the submerged surface of a structure, it is possible to form a thin air layer that adheres to the surface of the coating layer.

2) The first constitutional element of this invention is the condition of the coating surface formed over the immersed surface. The coating surface is essentially formed of a water-repellent material and the contact angle with water on the finally processed surface should be not less than 90° or preferably 110° or larger.

In some cases the coating surface may be formed, over its entire area, of a water-repellent material having a specified contact angle. If only those portions of the surface that need to repel water coming in contact with the surface, or at least the vertices of the projected portions of the roughened surface, are formed of a water-repellent material, a sufficient water repelling effect can be obtained.

An appropriate water-repellent material may be selected from among those mentioned in this specification. It is important that the water-repellent material be further formed with fine depressions and projections by various means, such as plating (electrolytic dispersion plating and electroless dispersion plating techniques), mechanical machining (die extrusion, injection molding, transfer by rolls having fine depressions and projections, pressing, and screen mesh techniques), coating (a method of applying a resin mixed with powder, a method of injecting or projecting powder onto surface, and an electrostatic coating method), a high-density energy method (a method of roughening a surface using a laser and plasma), and a sticking technique (a method of sticking a water-repellent film or sheet locally or entirely).

If the material used is a hydrophilic material, it can be given a water repelling property by means of surface treatment and thus can be utilized effectively.

3) The second constitutional element of this invention is sizes of depressions and projections.

It is essential that the coating surface should be formed with fine depressions and projections. These depressions and projections are so sized that the projection spacing s is in the range of 0.3 to 30 μm and the projection's height-to-spacing ratio h/s is in the range of 0.3 to 3.

When the spacing between the projections is greater than 30 μm, it is difficult to stably hold air on the surface for a long period of time. On the contrary, if the spacing is smaller than 0.3 μm, the air held in the depressions tends to decrease in volume and relatively easily separate.

The height of projections h is related to their spacing and cannot be determined arbitrarily. Thus, the range of their height is restricted by the height-to-spacing h/s ratio.

If the coating layer with fine depressions and projections is to be formed on one side of a base plate or substrate, it is suited for application to small-scale submerged surfaces. However, if the coating surface is to be applied to large equipment such as ships, floating breakwaters, underwater piles and caissons, it is preferable to adopt a coating layer that has a composite roughened surface formed by a combination of relatively large and fine depressions and projections formed on their surface.

As to the very small depressions and projections, although they have a sufficient capacity to hold an air layer, they lack the ability to distribute the supplied air uniformly over the entire coating surface. To cope with this problem, the substrate surface may first be formed with relatively large depressions and projections, on which fine depressions and projections may then be formed, thus producing a desired roughened composite surface.

The relatively large depressions and projections serve as passages to distribute air over the coating surface. Arranging the relatively large depressions and projections in the form of a net helps to disperse air evenly.

4) The third constitutional element of this invention is to supply air from outside to the coating surface processed as mentioned above and formed on the submerged surface of a structure.

The nozzles used need to be of such a construction as will keep the volume of supplied air as small as possible. Unlike the conventional technique which supplies a large volume of air to change the density of water and thereby reduce the fluid friction drag, this invention is characterized, as mentioned in the specification, in that a thin air layer is formed only on the coating surface. For this purpose, it is preferred to use a means that can supply air thinly so that the air can be arrested by the coating surface.

The nozzles for delivering air may be formed as a large number of small-diameter nozzles or as a slit. Where there is a large velocity difference between water and the coating surface, as in the case of ships, it may be difficult to supply air uniformly to the coating surface. For this reason, it is necessary to design the nozzles specifically according to various conditions such as the ship's shape and speed.

In the case of a ship, the air delivered from the nozzle tends to move away from the hull side because of dynamic actions of water flows and vortex currents. Hence, for the air to be injected close to the coating surface, it is advised to use a nozzle made of porous material or a device that delivers air from the back of a sheet pressed against the surface of the hull by water pressure. Employing such a nozzle and device will ensure the formation of a good air layer.

Case of an immersed structure having a long coating surface, such as a ship, it is desired that the nozzle be arranged transversely across the hull or that the nozzle shape, size and location be reflected in nozzle design and arrangement according to pressure changes in vortices produced at the hull side.

5) The most effective application of this invention lies in reducing the fluid friction drag of a ship to thereby economize the power required for propulsion. For that end, a coating layer is formed on the surface of the hull and air is supplied to the coating surface to form a thin air layer to keep water from coming into contact with the coating surface. This air layer also serves to prevent underwater organisms from adhering to the hull while at rest. It also prevents underwater organisms and contaminating substances from attaching to the surfaces of stationary structures such as piers and caissons.

Another application of this invention involves liquid transport channels such as liquid transport pipes and troughs. The liquid transport pipes have fluid friction resistance, so that transport of liquid requires a large driving power. Application of this invention to a water intake pipe of an electric power generation facility allows a substantial reduction in the fluid friction resistance. This in turn makes it possible to reduce the diameter of the pipe and also reduce the power of pump. In the case of troughs, this invention likewise can reduce their cross sections. Furthermore, because of its anticontamination effects, the invention prolongs the life of the liquid transport channels such as pipes.

6) This invention is effectively applied to the bottom of a ship. Air is apt to escape from the inclined surfaces such as hull side or even from the hull bottom when the hull is tilted greatly. Measures for preventing the escape of air should be taken, which may include the use of cover plate or covering step to form air passages, and the arrangement of nozzles in multiple stages.

This invention efficiently reduces the fluid friction by a small volume of air. For this purpose, sensors are provided at various locations to detect the state of the air layer so that a minimal required amount of air can be supplied to nozzles.

(Advantages of the Invention)

This invention is characterized by a thin air layer, which is formed by: covering an immersed surface of a structure having an immersed portion with a coating layer, which has fine depressions and projections at the surface thereof and which has at least vertices of the projections formed of a water-repellent material; and supplying air to the coating surface to form a thin air layer between the coating layer surface and water.

Thus, the thin air layer formed on the coating surface is not easily separated from it, and supplying only a small volume of air with very small power can retain the air layer on the coating surface. The air layer can achieve reduction in fluid friction resistance and prevention of contamination and corrosion.

In more concrete terms, the coating layer surface is formed with minute depressions and projections and at least the vertices of the projections are covered with a coating layer of a water-repellent material. Thus, the coating layer has a water repelling action at its surface, so that the air supplied over the surface of the coating layer easily flows into the depressions and remains containing there by the water pressure and the surface tension of water.

With a small volume of air retained in the fine depressions, when additional air is further supplied, it tends to move to a more stable condition by reducing the surface energy between water and air, with the result that the additional air is attracted to and merges with the air contained in the depressions to form a thin air layer easily and efficiently. This air layer can reduce the fluid friction resistance.

The air layer can also prevent underwater organisms and contaminating substances from adhering to the surface of a submerged portion of a stationary structure held at a fixed position.

TABLE 1

Relationship between ship's speed and reduction of drag

| Froude's number Fr | Ship speed U m/s | Maximum DR % (calculated as viscous resistance) | Maximum DR' (calculated as frictional resistance of test piece) |
|---|---|---|---|
| 0.10 | 0.84 | 16.4 | 70.3 |
| 0.15 | 1.27 | 6.5 | 27.9 |
| 0.20 | 1.69 | 13.3 | 57.0 |
| 0.25 | 2.11 | 19.4 | 83.2 |

TABLE 1-continued

Relationship between ship's speed and reduction of drag

| Froude's number Fr | Ship speed U m/s | Maximum DR % (calculated as viscous resistance) | Maximum DR' (calculated as frictional resistance of test piece) |
|---|---|---|---|
| 0.30 | 2.53 | 16.9 | 72.5 |

TABLE 2

Flow rate of air supplied Qa l/min

| Air quantity level | 1 | 2 | 5 | 10 | 20 |
|---|---|---|---|---|---|
| Average air layer thickness mm | 0.05 | 0.10 | 0.24 | 0.48 | 0.95 |
| Flow rate of air supplied Qa l/min | 4.8 | 9.6 | 24.1 | 48.1 | 96.2 |

We claim:

1. A method of forming an air layer over an immersed surface of a structure having an immersed portion, comprising the steps of:
covering the immersed surface of a structure having an immersed portion with a coating layer, which has minute depressions and projections at the surface thereof and which has at least vertices of the projections formed of a water-repellent material; and continually supplying air to the coating surface to form an air layer between the coating surface and water.

2. A method of forming an air layer over an immersed surface of a structure according to claim 1, wherein the structure having the immersed portion is a ship.

3. A method of forming an air layer over an immersed surface of a structure according to claim 1, wherein the structure having the immersed portion is a floating body.

4. A method of forming an air layer over an immersed surface of a structure according to claim 1, wherein the water-repellent material is selected from the group consisting of materials including a polytetrafluoroethylene, a powdered hydrophobic silica, a polyethylene, a polypropylene, a hydrophilic resin surface-treated to give it a water repelling property and mixtures thereof.

5. A method of forming an air layer according to claim 1, wherein the air is held in the depressions of fine formed in the immersed surface by surface tension of water swollen by water pressure.

6. A method of forming an air layer according to claim 1, wherein the depressions and projections of the surface of the coating layer are formed such that the spacing s of the projections is in the range of 0.3 to 30 μm and the projection's height-to-spacing ratio h/s is in the range of 0.3 to 3.

7. A method of forming an air layer over an immersed surface of a structure according to claim 1, wherein a plurality of nozzles are arranged at certain spacings on the immersed surface of a structure having an immersed portion and air is supplied from the nozzles along the coating surface having fine depressions and projections.

8. A method of forming an air layer over an immersed surface of a structure according to claim 1, wherein primary air is held in the depressions in the coating surface and secondary air is supplied from outside to the coating surface.

9. A method of forming an air layer according to claim 1, wherein the surface of a water-repellent synthetic resin sheet is formed with fine depressions and projections, by a transfer method.

10. A method of forming an air layer according to claim 1, comprising: forming said coating layer over the surface of a structure; and fixing fine particles on the surface of the coating layer so that the fine particles protrude from the surface;
wherein at least vertices of the fine particles protruding from the coating layer have a water repelling property.

11. A method of forming an air layer over an immersed surface of a structure according to claim 1, wherein the structure having the immersed portion is a structure driven into the bottom of the water and held stationary at a fixed position.

12. A method of forming an air layer over an immersed surface of a structure having an immersed portion, comprising the steps of:
covering the immersed surface of a structure having an immersed portion with a coating layer, which has minute depressions and projections at the surface thereof and which has at least vertices of the projections formed of a water-repellent material; and supplying air to the coating surface to form an air layer between the coating surface and water, wherein the structure having the immersed portion is a liquid transport channel and the immersed surface is an inner surface of the liquid transport channel.

13. A method of forming an air layer over an immersed surface of a structure having an immersed portion, comprising the steps of:
covering the immersed surface of a structure having an immersed portion with a coating layer, which has minute depressions and projections at the surface thereof and which has at least vertices of the projections formed of a water-repellent material; and supplying air to the coating surface to form an air layer between the coating surface and water, wherein said coating layer has a two-layer structure comprising a surface with relatively large roughness and a surface with fine roughness.

14. A method of forming an air layer over an immersed surface of a structure having an immersed portion, comprising the steps of:
covering the immersed surface of a structure having an immersed portion with a coating layer, which has minute depressions and projections at the surface thereof and which has at least vertices of the projections formed of a water-repellent material; and supplying air to the coating surface to form an air layer between the coating surface and water wherein said covering of the immersed surface comprises:
providing a coating layer formed over the surface of a structure; and
forming fine depressions and projections in the surface of the coating layer by fine particles;
covering the fine particles with a water-repellent material.

15. A a method of forming an air layer over an immersed surface of a structure having an immersed portion, comprising the steps of:
covering the immersed surface of a structure having an immersed portion with a coating layer, which has minute depressions and projections at the surface thereof and which has at least vertices of the projections formed of a water-repellent material; and supplying air to the coating surface to form an air layer between the coating surface and water, said coating layer having a two-layer, finely roughened structure formed by the steps comprising:

providing a bottom layer formed on the surface of a structure and including relatively large particles; and providing a top layer formed on the bottom layer and including particles smaller than those of the bottom layer so that the two-layer, finely roughened structure has large depressions and projections and smaller depressions and projections formed on respective surfaces of layers.

16. A method of reducing the friction resistance between a marine vessel and water, comprising:

making at least a water-contacting part of the marine vessel comprising a surface having a property of retaining air;

providing an air injection zone at an upstream position on said surface;

providing means for forming a thin layer of air over said surface of said water-contacting part with the air injected through said air injection zone when the marine vessel is navigated, forming said means by a coat layer having fine surface irregularities, and forming at least peak portions of the surface irregularities with a water repellent material; said coat layer retaining a primary air in water;

supplying a secondary air out of said air injection zone into the primary air layer and permitting secondary air to be absorbed in and joined with the primary air layer and spread to form a thin layer of air over said surface; and navigating the marine vessel while a portion of air in a water contacting surface portion of the thin layer of air, to be carried away towards the stem of the marine vessel, is replenished with the secondary air injected through said air injection zone.

17. A marine vessel with a reduced friction resistance with water, comprising:

a hull of which at least a water-contacting part comprises a surface having an air retaining property;

an air injection zone provided at an upstream position on said surface; and means for forming a thin layer of air over said surface with the air injected through said air injection zone when the marine vessel is navigated, said means comprising a coat layer having fine surface irregularities, at least peak or top portions of said surface irregularities being formed of a water repellent material said coat layer having a property of retaining in water a primary air comprising a thin film of air;

said air injection zone extending in the direction of the hull width in a manner such that at an upstream position on said coat layer, said air injection zone can inject a secondary air to the vicinity of the surface of the coat layer;

the arrangement being such that the secondary air is supplied to the primary air retained over the surface of the coat layer and permitted to spread over the surface of the coat layer to form a thin layer of air, which is constantly maintained over the water-contacting part of the marine vessel with an amount of air to be peeled and carried away from a stem part of the marine vessel in accordance with the navigation of the marine vessel being replenished with the secondary air being supplied.

18. A marine vessel as claimed in claim 17, wherein said air injection zone comprises a plurality of air injection nozzles arranged at an upstream position and in the vicinity of the coat layer in a manner such that streams of the secondary air are injected spaced in the direction of the hull width.

19. A marine vessel as claimed in claim 17, wherein said air injection zone comprises a slit-type air injection nozzle arranged at an upstream position and in the vicinity of the coat layer, said slit-type air injection nozzle extending in the direction of the hull width.

20. A marine vessel as claimed in any one of claims 17, 18 and 19, wherein said air injection zone is arranged so as to inject air in the direction of from the bow to the stem of the marine vessel.

21. A marine vessel as claimed in claim 17, wherein said means for forming a thin layer of air over the water-contacting part comprises a coat layer of a water repellent material and has fine surface irregularities, which have an angle of contact with water of 90° or above.

22. A marine vessel as claimed in one of claims 17, or 21, wherein said water-repellent material is selected from the group consisting of polytetrafluoroethylene, powder of hydrophobic silica, polyethylene, polypropylene, and mixtures thereof.

23. A marine vessel as claimed in one of claims 17, or 21, wherein said water-repellent material is a material having a hydrophilic surface imparted with hydrophobicity by a surface treatment.

24. A marine vessel as claimed in claim 17, wherein said peak or top portions of surface irregularities are spaced at an intervals within a range of 0.3 to 30 µm and have a height h, and the ratio of said height to said interval, h/s, is within a range of 0.3 to 3.

25. A marine vessel as claimed in claim 17, wherein the surface of said hull is formed with a paint layer, the surface of which is formed with fine irregularities with fine particles, the exposed surface having the fine irregularities being covered with a material having a water repellency.

26. A marine vessel as claimed in claim 17, wherein the surface of said hull is applied with an under-layer comprising a paint layer incorporated with particles of a relatively large particle diameter, an upper-layer formed on the under-layer being incorporated with particles of a relatively small particle diameter. the upper-layer being covered with a water repellent material. the surface covered with the water repellent material having large irregularities attributable to the particles of said relatively large particle diameter and fine irregularities attributable to the particles of said relatively small particle diameter.

27. A marine vessel as claimed in claim 17, wherein the surface of at least said peak or top portions of the surface irregularities have an angle of contact with water of 90° or above, said coat layer having a property such that when a small amount of secondary air is supplied from the lower end side of the coat layer held in water in a vertically inclined position thereof with its outer surface facing above, the supplied secondary air becomes absorbed in and joined with a small amount of the primary air held in the fine irregularities on the surface of the coat layer, then flow upwardly while spreading and forming a thin film of air, and leaves the coat layer from an upward end part of the coat layer and into water in the form of air bubbles.

28. A marine vessels claimed in claim 17, wherein said coat layer formed on the surface of said hull comprises a paint layer.

29. A marine vessel as claimed in claim 17, wherein said coat layer formed on the surface of said hull comprises a sheet-type material attached to the hull surface.

30. A marine vessel as claimed in claim 17, wherein said coat layer having fine surface irregularities is formed by means of pressing carried out with use of a mold having fine surface irregularities or a press roll having fine surface irregularities.

31. A marine vessel as claimed in claim 17, wherein said coat layer having fine surface irregularities is formed by means of a screen mesh method by which a fine mesh pattern is transfer-printed.

32. A marine vessel as claimed in claim 17, wherein said coat layer having fine surface irregularities is formed by means of roughening the surface of a synthetic resin sheet by irradiation of high density energy of laser beams or plasma.

* * * * *